US012687766B2

(12) United States Patent
Hwang et al.

(10) Patent No.: US 12,687,766 B2
(45) Date of Patent: Jul. 21, 2026

(54) CAMERA MODULE

(71) Applicant: LG INNOTEK CO., LTD., Seoul (KR)

(72) Inventors: Sun Min Hwang, Seoul (KR); Jong Cheol Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 137 days.

(21) Appl. No.: 18/686,956

(22) PCT Filed: Aug. 24, 2022

(86) PCT No.: PCT/KR2022/012679
§ 371 (c)(1),
(2) Date: Feb. 27, 2024

(87) PCT Pub. No.: WO2023/027513
PCT Pub. Date: Mar. 2, 2023

(65) Prior Publication Data
US 2024/0377712 A1     Nov. 14, 2024

(30) Foreign Application Priority Data

Aug. 27, 2021     (KR) ........................ 10-2021-0114182

(51) Int. Cl.
*G03B 17/12*     (2021.01)
*G03B 30/00*     (2021.01)
(52) U.S. Cl.
CPC ............. *G03B 17/12* (2013.01); *G03B 30/00* (2021.01)
(58) Field of Classification Search
None
See application file for complete search history.

(56) References Cited

U.S. PATENT DOCUMENTS

| | | | |
|---|---|---|---|
| 2015/0189137 A1 | 7/2015 | Han et al. | |
| 2019/0121050 A1* | 4/2019 | Park ........................ | G02B 7/02 |
| 2024/0422415 A1* | 12/2024 | Hwang ................. | G03B 17/12 |

FOREIGN PATENT DOCUMENTS

| | | | | |
|---|---|---|---|---|
| EP | 3509289 | 7/2019 | | |
| EP | 3651445 | 5/2020 | | |
| JP | 2019-511874 | 4/2019 | | |
| KR | 10-2010-0048101 | 5/2010 | | |
| KR | 20170084550 A | * 7/2017 | ............. | G03B 17/02 |
| KR | 10-2018-0026146 | 3/2018 | | |
| KR | 10-2019-0091978 | 8/2019 | | |

(Continued)

OTHER PUBLICATIONS

International Search Report dated Nov. 25, 2022 issued in Application No. PCT/KR2022/012679.

(Continued)

*Primary Examiner* — Rodney E Fuller
(74) *Attorney, Agent, or Firm* — KED & ASSOCIATES, LLP

(57)     ABSTRACT

A camera module comprises: a first body on which a lens is disposed; a second body coupled to the first body; a plurality of substrates disposed between the first body and the second body; and a support member for fixing the plurality of substrates so that the substrates are spaced apart in the optical axis direction, wherein the support member includes sidewalls disposed between different substrates and extension parts extending from the sidewalls.

18 Claims, 6 Drawing Sheets

(56)  References Cited

FOREIGN PATENT DOCUMENTS

| | | | | |
|---|---|---|---|---|
| KR | 20200014504 A * | 2/2020 | ............. | G03B 17/02 |
| KR | 10-2020-0055548 | 5/2020 | | |
| WO | WO-2018066911 A1 * | 4/2018 | ............. | G03B 17/08 |

OTHER PUBLICATIONS

European Search Report dated Jul. 18, 2025 issued in Application No. 22861721.3.

* cited by examiner (a)

(b)

CAMERA MODULE

CROSS-REFERENCE TO RELATED PATENT APPLICATIONS

This application is a U.S. National Stage Application under 35 U.S.C. § 371 of PCT Application No. PCT/KR2022/012679, filed Aug. 24, 2022, which claims priority to Korean Patent Application No. 10-2021-0114182, filed Aug. 27, 2021, whose entire disclosures are hereby incorporated by reference.

TECHNICAL FIELD

The present embodiment relates to a camera module. More specifically, the present invention relates to a camera module that minimizes the reduction of component mounting space in a multiple substrate stack structure.

BACKGROUND ART

In general, since camera modules are manufactured in small sizes and are applied to various IT devices such as camera phones, PDAs, smartphones, and other portable mobile communication devices, in recent years, the release of devices equipped with small camera modules is gradually increasing according to various preferences of consumers.

Recently, due to the advancement and automation of vehicle parts, camera modules for image acquisition are being widely used. For such examples, there are camera modules being used in front and rear surveillance cameras, black boxes, and the like.

In addition, as demands for driver convenience and safety increase in the automobile industry, a variety of new technologies are being applied. In particular, technology using cameras is being actively applied by converging with software technology.

Meanwhile, recently, a structure is being studied in which a plurality of substrates being disposed inside the camera module of vehicle camera is provided for lamination. However, when fixing a plurality of substrates using screws, the area of the substrates where the screws are coupled becomes an unusable area, which causes a problem in that component mounting space is reduced. In addition, there is a problem that the time required for the manufacturing process increases due to the screw fastening operation. In addition, there is a problem in that there is a possibility of substrate bending occurring due to excessive torque when fastening screws.

DETAILED DESCRIPTION OF THE INVENTION

Technical Subject

The present embodiment is intended to provide a camera module that minimizes the reduction of component mounting space in a multiple substrate stack structure.

In addition, the present embodiment is intended to provide a camera module that can minimize process time because the process is simplified with a hook fastening structure.

Technical Solution

In order to solve the above technical problem, the camera module according to an embodiment of the present invention may comprise: a first body on which a lens is disposed; a second body coupling with the first body; a plurality of substrates being disposed between the first body and the second body; and a support member for fixing the plurality of substrates so that the substrates are spaced apart in an optical axis direction, wherein the support member includes sidewalls being disposed between different substrates and extension parts being extended from the sidewalls.

The extension part may comprise: a first surface being extended from the extension part to form an inclined surface; a second surface being extended from the first surface and including a hole; and a third surface being extended from the second surface to form an inclined surface.

A side surface among at least one of the plurality of substrates may include a protruded part coupling to the hole of the second surface of the extension part.

At least one substrate among the plurality of substrates may include a rib being in contact with the sidewalls of the support member on a side surface not being formed with the protruded part.

A part where the sidewalls and the first surface of the extension part are connected may include a plurality of grooves being formed by being recessed.

The support member may include a connecting part for connecting two adjacent sidewalls and being perpendicular to the sidewalls.

The plurality of substrates includes first to third substrates sequentially adjacent to the first body, and the support member may include: a first support member being disposed between the first substrate and the second substrate; and a second support member being disposed between the second substrate and the third substrate.

The sidewalls of the first support member and the sidewalls of the second support member may be disposed to be overlapped with each other in an optical axis direction.

The second substrate and the third substrate may have the same shape and size.

In order to solve the above technical problem, a camera module according to another embodiment of the present invention comprises: a first body on which a lens is disposed; a second body being coupled to the first body; first to third substrates being disposed between the first body and the second body; and a first support member being disposed between the first substrate and the second substrate; and a second support member being disposed between the second substrate and the third substrate, wherein the first and second support members may include sidewalls being disposed between different substrates and an extension part being extended from the sidewalls.

The extension part may comprise: a first surface being extended from the sidewalls to form an inclined surface; a second surface being extended from the first surface and including a hole; and a third surface being extended from the second surface to form an inclined surface.

In a part where the sidewalls and the first surface of the extension part are connected, a plurality of grooves being formed by being recessed may be included.

An automobile according to an embodiment of the present invention comprises: a vehicle body; a door being mounted in the vehicle body; a display unit being disposed inside the vehicle body; and the camera module, wherein the camera module is disposed in at least one of the vehicle body and the door and can be electrically connected to the display unit.

Advantageous Effects

Through the present embodiment, the reduction of a component mounting space can be minimized despite the stacked structure of multiple substrates. In particular, compared to a screw-based coupling structure, a wider space for component mounting can be secured.

In addition, the process becomes simplified due to the hook fastening structure so that the process time is minimized, thereby enhancing workability and productivity.

In addition, substrate bending that may occur during the coupling process between pluralities of substrates can be prevented.

In addition, it can prevent the substrate from shaking when the camera module vibrates.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the present embodiments, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the present embodiment, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under)", the meaning of not only an upward direction but also a downward direction based on one component may be included.

The 'optical axis direction' used below is defined as the optical axis direction of the lens. Meanwhile, 'optical axis direction' may correspond to such as 'up and down direction', 'z-axis direction', and the like.

Hereinafter, the configuration of a camera module according to an embodiment of the present invention will be described with reference to the drawings.

Figure 1:
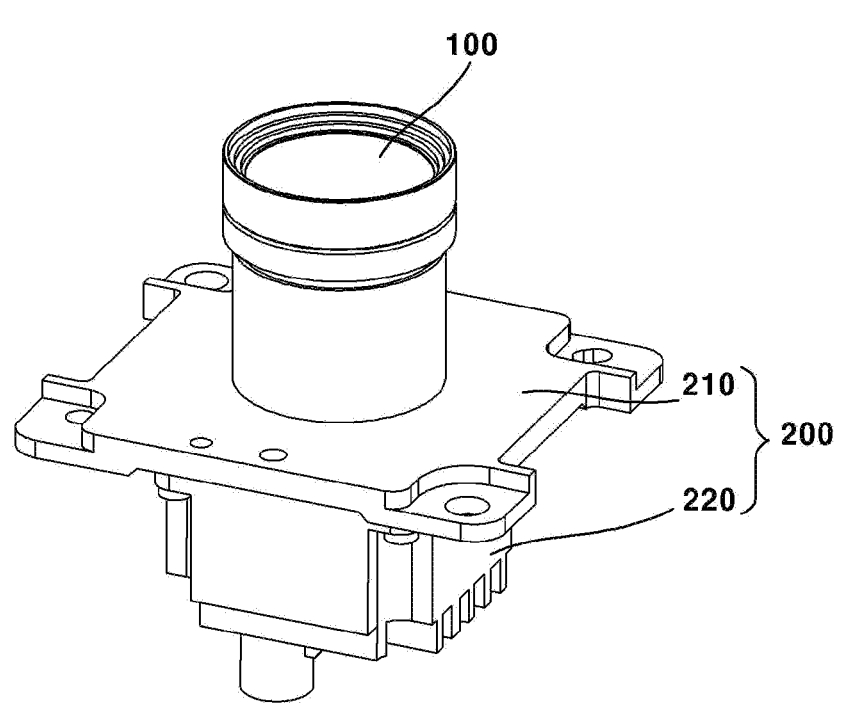
FIG. 1 is a perspective view of a camera module according to an embodiment of the present invention.
Figure 2:
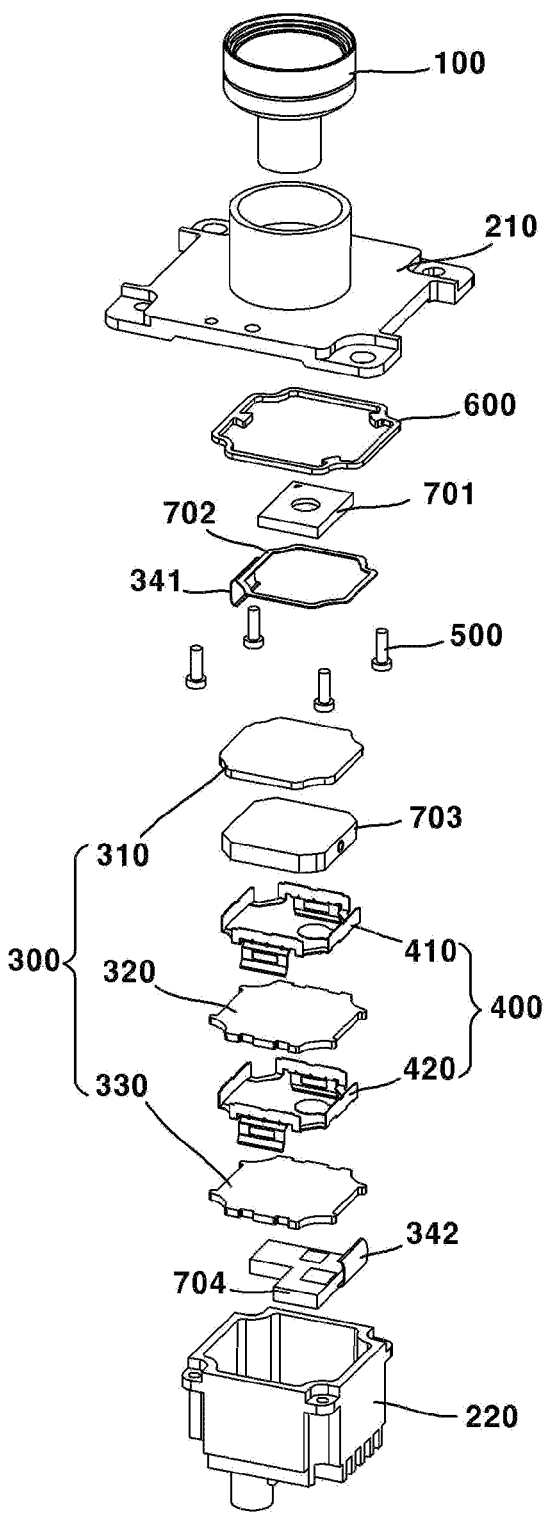
FIG. 2 is an exploded perspective view of a camera module according to an embodiment of the present invention.
Figure 3:
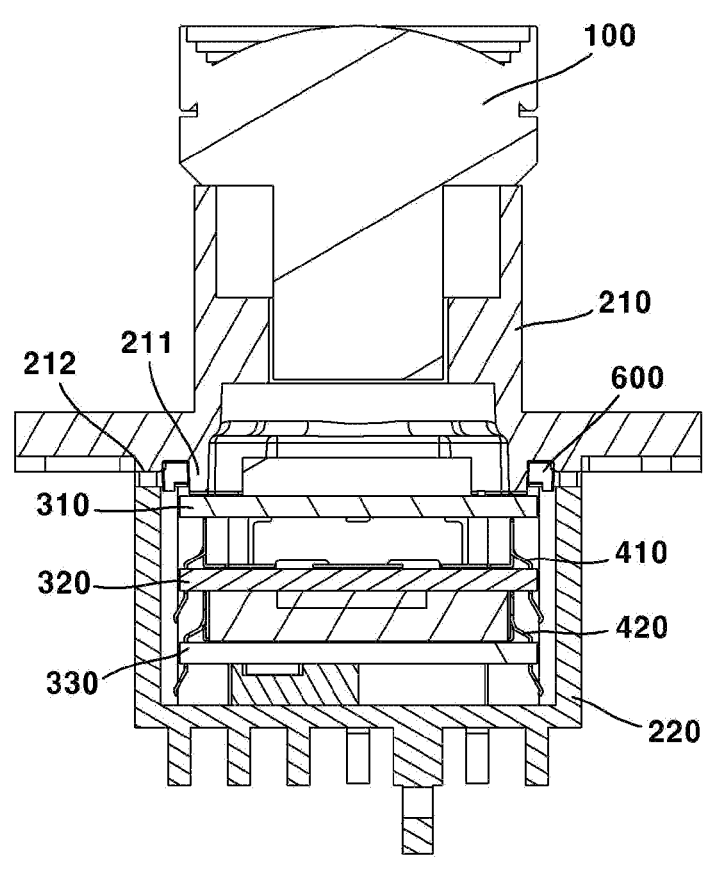
FIG. 3 is a cross-sectional view of a camera module according to an embodiment of the present invention.
Figure 4:
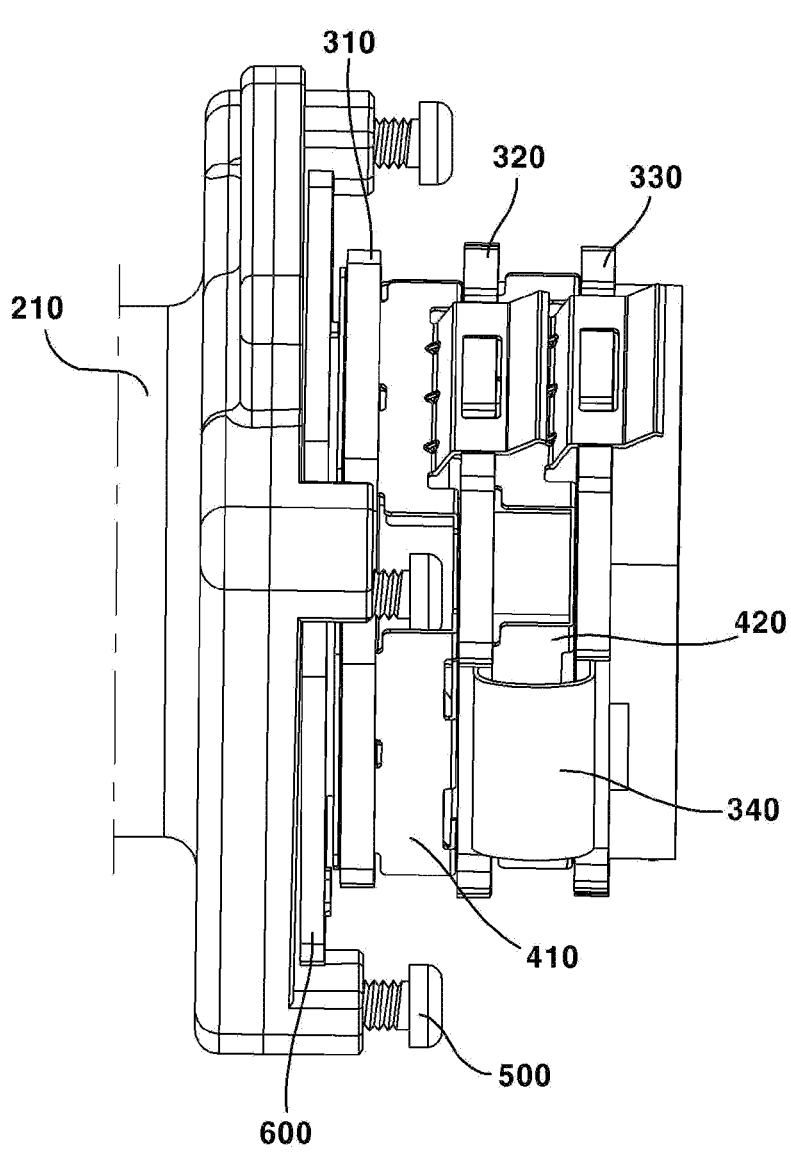
FIG. 4 is an enlarged perspective view of an internal structure of a camera module according to an embodiment of the present invention.
Figure 5:
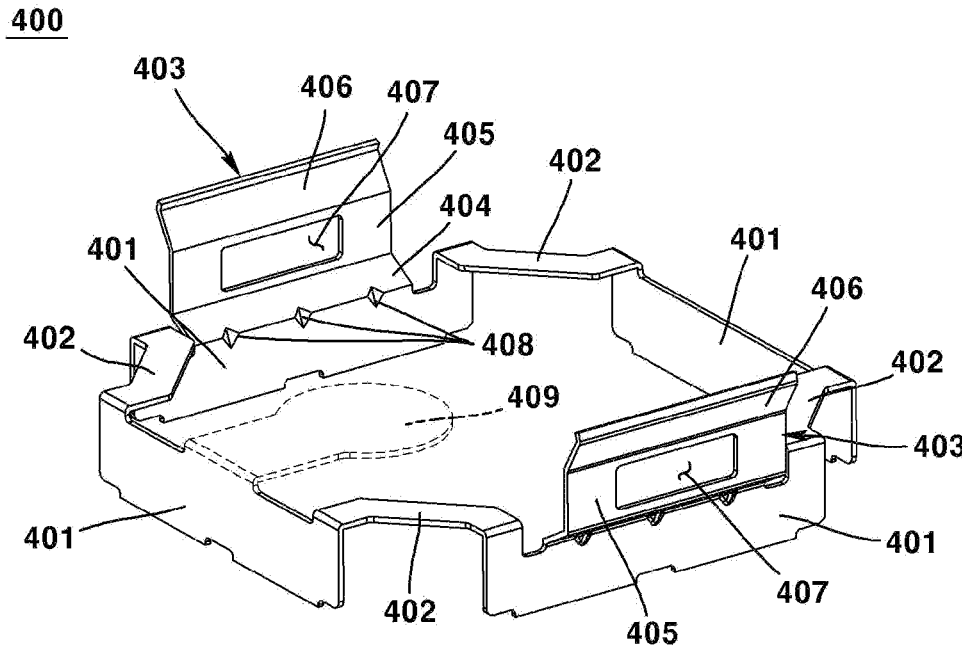
FIG. 5 illustrates a support member of a camera module according to an embodiment of the present invention.
Figure 6:
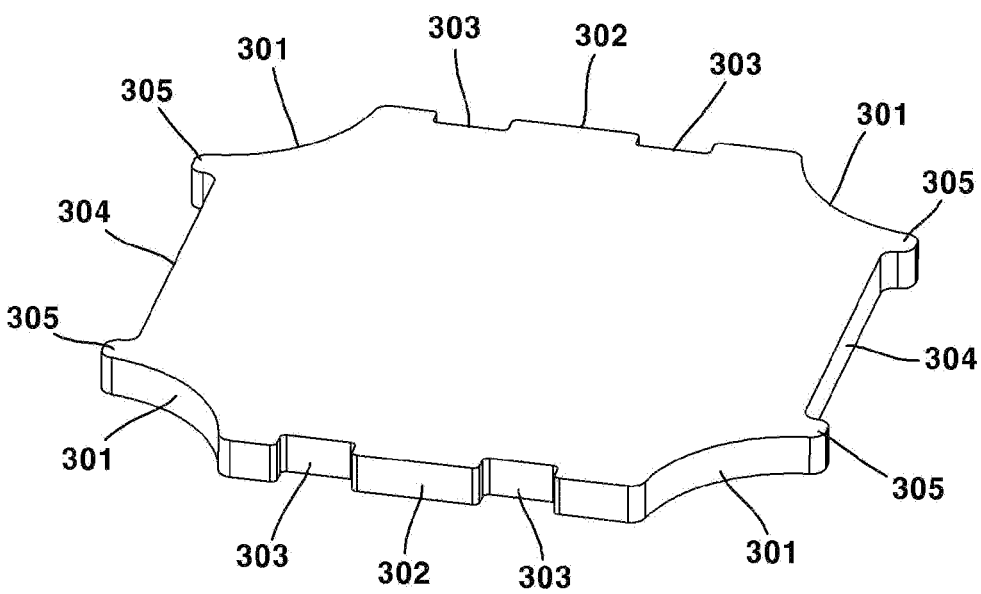
FIG. 6 illustrates a substrate of a camera module according to an embodiment of the present invention.

FIG. 1 is a perspective view of a camera module according to an embodiment of the present invention; FIG. 2 is an exploded perspective view of a camera module according to an embodiment of the present invention; FIG. 3 is a cross-sectional view of a camera module according to an embodiment of the present invention; FIG. 4 is an enlarged perspective view of an internal structure of a camera module according to an embodiment of the present invention; FIG. 5 illustrates a support member of a camera module according to an embodiment of the present invention; FIG. 6 illustrates a substrate of a camera module according to an embodiment of the present invention; and FIG. 7(*a*) illustrates a conventional substrate arrangement structure, and FIG. 7(*b*) illustrates a substrate arrangement structure according to an embodiment of the present invention.

The camera module according to an embodiment of the present invention may be a vehicle camera module. The camera module may be coupled to the vehicle. The camera module may be used in at least one among a vehicle front camera, a side camera, a rear camera, an in-vehicle driver surveillance camera, and a black box. The camera module may be disposed at the front of the vehicle. The camera module may be disposed at the rear of the vehicle. The camera module may be disposed on the side of the vehicle. A vehicle may include a vehicle body in which a driver rides, a door being mounted on the car body, and a display unit being disposed inside the vehicle body. The camera module may be disposed in at least one of the vehicle body and the door. The camera module may be electrically connected to the display unit.

A camera module according to an embodiment of the present invention may include a body part 200, a plurality of substrates 300, and a support member 400.

The camera module may include a body part 200. The body part 200 may include a first body 210 and a second body 220.

A lens may be disposed in the first body 210.

More specifically, the first body 210 may be referred to as any one among a front housing, a front body, an upper housing, and a first housing. The first body 210 may include a lens. The first body 210 may include a lens barrel. A lens barrel may be disposed on one side of the opening of the first body 210. The lens barrel can accommodate a lens inside. A lens may be disposed in the hole of the lens barrel. The inner surface of the hole of the lens barrel may be formed in a size and shape corresponding to the outer circumferential shape of the lens. The lens barrel and lens may be formed integrally. The first body 210, the lens barrel, and the lens may be formed as one body. The first body 210, the lens barrel, and the lens may be formed separately. The lens may include a plurality of lenses. The lens may be aligned with an image sensor 701. The lens may be optically aligned with the image sensor 701. The optical axis of the lens may coincide with the optical axis of the image sensor 701. The first body 210 may include an infrared filter (IR filter) being disposed between the lens and the image sensor 701.

The second body 220 may be coupled to a lower side of the first body 210.

More specifically, the second body 220 may be referred to as any one among a rear housing, a rear body, a lower housing, and a second housing. The second body 220 may be formed in a square shape with an open upper part. The second body 220 may be formed of a metal material. The second body 220 may be disposed below the first body 210. The second body 220 may be coupled with the first body 210. The second body 220 may form an internal space through the coupling with the first body 210. The second body 220 may include a space part whose upper surface is open.

The lower surface of the first body 210 may include a first boss part 211 being in contact with one surface of the first substrate 310. An adhesive member 702 may be disposed between one surface of the first substrate 310 and the first boss part 211. The adhesive member 702 may be formed in a strip shape corresponding to the shape of the edge of one surface of the first substrate 310. The lower surface of the first body 210 may include a second boss part 212 being in contact with the second body 220. The lower surface of the first body 210 may include: a concave part between the first boss part 211 being in contact with one surface of the first substrate 310; and the second boss part 212 being in contact with the second body 220. The concave part may be a space being formed by the first boss part 211 and the second boss part 212 being protruded from a lower surface of the first body 210.

A sealing member 600 may be disposed between the first body 210 and the second body 220. A scaling member 600 may be disposed in a space formed by the first boss part 211 and the second boss part 212. Foreign substances can be prevented from entering the internal space of the first body 210 and the second body 220 through the sealing member 600.

The first body 210 and the second body 220 may be coupled through a screw 500. The second body 220 may have a hole where the screw 500 is coupled to the square corner. The first body 210 and the second body 220 may be coupled with an adhesive. The first body 210 and the second body 220 may be coupled with an epoxy.

The second body 220 may include a connector lead-out part on the bottom surface. The connector lead-out part may be coupled to the bottom surface. The connector lead-out part may be disposed in a hole (not shown) in the bottom surface. The connector lead-out part may penetrate a hole in the bottom surface. A connector may be disposed inside the connector lead-out part. The connector lead-out part may be formed of a metal material.

A plurality of substrates 300 may be disposed between the first body 210 and the second body 220.

More specifically, the plurality of substrates 300 may be printed circuit substrates (PCBs). Electronic components may be mounted on at least one of the upper surface and the lower surface of each of the plurality of substrates 300. The plurality of substrates 300 may be rigid substrates. The plurality of substrates 300 may be disposed so that the upper surface and the lower surface face each other.

The plurality of substrates 300 may include first to third substrates 310, 320, and 330 sequentially disposed adjacent to the first body 210. The first substrate 310 is a substrate being disposed closest to the lens, and an image sensor 701 may be mounted on an upper surface of the first substrate 310. A first heat dissipation member 703 may be disposed on a lower surface of the first substrate 310. The first heat dissipation member 703 may allow heat being generated from the image sensor 701 to be discharged. The first heat dissipation member 703 may be disposed on a lower surface of the second substrate 320. The third substrate 330 is a substrate being disposed closest to the bottom surface of the second body 220, a second heat dissipation member 704 may be disposed on the bottom surface of the third substrate 330, and a connector may be coupled thereto. The plurality of substrates 300 may be electrically connected to a connector. This is merely an example, and various electronic components may be mounted on at least one of one side and the other side of the first to third substrates 310, 320, and 330. The third substrate 330 may be disposed to be spaced apart from the bottom surface of the second body 220. At least some of the side surfaces among the plurality of substrates 300 may be in contact with an inner surface of the second body 220. The plurality of substrates 300 may include additional substrates in addition to the first to third substrates 310, 320, and 330.

The plurality of substrates 300 may be electrically connected to each other by flexible substrates being connected to side surfaces. Referring to FIG. 2, the first flexible substrate 341 is fixed to one end of the adhesive member 702, so that the first substrate 310 and the second substrate 320 can be electrically connected to each other. The second flexible substrate 342 is fixed to the second heat dissipation member 704, so that the second substrate 320 and the third substrate 330 can be electrically connected to each other. This is only an example, the first flexible substrate 341 may be connected to the side surface of the first substrate 310 and the side surface of the second substrate 320; and the second flexible substrate 342 may be connected to the side surface of the second substrate 320 and the side surface of the third substrate 330. With respect to the side surface of the second substrate 320, the first flexible substrate 341 and the second flexible substrate 342 may be disposed on opposite sides of each other to avoid mutual interference.

It may include a support member 400 that fixes the plurality of substrates 300 so as to be spaced apart from one another in an optical axis direction.

More specifically, the support member 400 may include a first support member 410 and a second support member 420. The first support member 410 and the second support member 420 may be formed in the same shape. The first support member 410 may be disposed on a lower surface of the first substrate 310. The first support member 410 may be disposed between the first substrate 310 and the second substrate 320. The second support member 420 may be disposed on a lower surface of the second substrate 320. The second support member 420 may be disposed between the second substrate 320 and the third substrate 330. The first support member 410 may support the first substrate 310 and the second substrate 320 while being spaced apart in an optical axis direction. The second support member 420 may support the second substrate 320 and the third substrate 330 while being spaced apart in an optical axis direction. The number of support members 400 may increase or decrease depending on the number of substrates being included in the camera module.

Hereinafter, with reference to FIG. 5, the support member 400 according to an embodiment of the present invention will be described. The first support member 410 and the second support member 420 are distinguished depending on their arrangement locations, and their shapes may be the same. The following description of the support member 400 may be a description of each of the first support member 410 and the second support member 420.

The support member 400 may include a plurality of sidewalls 401. The plurality of sidewalls 401 may include first sidewalls and second sidewalls being disposed to face each other, and third sidewalls and fourth sidewalls being connected to the first sidewalls and the second sidewalls and being disposed to face each other. A plurality of sidewalls 401 may be disposed to be spaced apart from each other.

One end of the plurality of sidewalls 401 of the first support member 410 may be disposed to be in contact with a lower surface of the first substrate 310. One end of the plurality of sidewalls 401 of the second support member 420 may be disposed to be in contact with a lower surface of the second substrate 320. The plurality of sidewalls of the first support member 410 and the plurality of sidewalls of the second support member 420 may be disposed to be overlapped with each other in an optical axis direction. Each of the plurality of sidewalls of the first support member 410 and the plurality of sidewalls of the second support member 420 may be disposed on a same virtual line.

The support member 400 may include a connecting part 402 connecting two adjacent sidewalls. The connecting part 402 may connect other ends of adjacent sidewalls 401 to one another. The connecting part 402 may connect the first sidewalls and the third sidewalls. The connecting part 402 may connect the first sidewalls and the fourth sidewalls. The connecting part 402 may connect the second sidewalls and the third sidewalls. The connecting part 402 may connect the second sidewalls and the fourth sidewalls. The connecting part 402 may be formed at four corners of the support member 400.

The connecting part 402 may be disposed to be perpendicular to the sidewalls 401. The connecting part 402 may be formed in a plane parallel to the substrate. The connecting part 402 may be formed so that both end parts are perpendicular to each sidewall 401, and the center part may be formed to form an obtuse angle with both end parts. Each of the both side surfaces of the connecting part 402 may be formed of three surfaces forming obtuse angles to each other. Both side surfaces of the connecting part 402 may be formed as curved surfaces. The inner side surface of the connecting part 402 may be formed to be longer than the outer side surface. The connecting part 402 may be formed to correspond to the shape of the edge of the substrate.

One surface of the connecting part 402 of the first support member 410 may be in contact with an upper surface of the second substrate 320. One surface of the connecting part 402 of the first support member 410 and the upper surface of the second substrate 320 may be fixed with an adhesive. One surface of the connecting part 402 of the second support member 420 may be in contact with an upper surface of the third substrate 330. One surface of the connecting part 402 of the second support member 420 and an upper surface of the third substrate 330 may be fixed with an adhesive.

A groove being recessed inward may be formed at the connecting part of the connecting part 402 and each sidewall 401. The groove may be formed to increase the rigidity of the part where the connecting part 402 and the sidewalls 401 are connected. The groove may be formed in a shape where triangular shapes face each other. The groove may be formed in a shape where inclined surfaces being recessed inward face each other. The groove may be a shape being created by inwardly bending the part where the connecting part 420 and each sidewall 401 meet.

Any one of the plurality of sidewalls 401 may include a grip part 409 being formed in an inward direction and perpendicular to the sidewalls. The grip part 409 may be formed in a circular shape with rounded ends at the center part of the sidewalls 401. The grip part 409 is a part for gripping the support member 400 during the injection process and can be removed during the camera module assembly process.

The first support member 410 may include an extension part 403 being extended from the sidewalls 401.

More specifically, the extension part 403 may be formed by being extended in one direction from the other end of the sidewalls facing each other. The extension part 403 may be formed by being extended from the first sidewalls and the second sidewalls. The extension part 403 may be formed by being extended from the third sidewalls and the fourth sidewalls. The extension part 403 may comprise: a first surface 404 being extended from the other end of the sidewalls 401 to form an inclined surface in an outward direction; a second surface 405 being extended from the first surface 404 in a direction parallel to the sidewalls 401 and including a hole 407; and a third surface 406 being extended from the second surface 405 to form an inclined surface in an outward direction. The extension part 403 may further include a part being extended from the third surface 406 in a direction parallel to the sidewalls 401.

Since the extension part 403 includes a first surface 404 forming an inclined surface, the substrate 300 being disposed on an upper side and a lower side of the support member 400 may be disposed to have the same size.

The protruded part 302 of the substrate 300 may be inserted and fixed into the hole 407 formed in the second surface 405. The concave parts 303 being formed on both sides of the protruded part 302 of the substrate 300 may be disposed to be in contact with the second surface 405 of the extension part 403. The third surface 406 may serve as a guide to facilitate insertion of the substrate 300 when the substrate 300 is coupled to the support member 400 from an upper side to a lower side. The third surface 406 and the part being extended from the third surface 406 may be fixed by being in contact with an inner side surface of the second body 220.

The plurality of substrates 300 may all be formed to have the same shape and size. The plurality of substrates 300 may be formed to have different shapes and sizes. Referring to FIG. 6, the second substrate 320 and the third substrate 330 may be formed to have the same size and shape. The following description of the shape of the substrate may be a description of each of the first to third substrates 310, 320, and 330.

The substrate 300 may include an avoidance part 301 in which four corner side surfaces are roundly recessed inward. The avoidance part 301 may be formed to avoid a part where the first body 210 and the second body 220 are screw-coupled. The substrate 300 may include a first side surface and a second side surface being disposed at an opposite side to each other, and a third side surface and a fourth side surface being disposed at an opposite side to each other and connecting the first side surface and the second side surface. A protruded part 302 being inserted into the hole 407 formed in the extension part 403 may be formed on a first side surface and a second side surface of the substrate 300. The protruded part 302 may be formed in a shape corresponding to the hole 407 formed in the extension part 403.

A concave part 303 being recessed inward may be formed on both sides of the protruded part 302. The concave part 303 may be in contact with a part other than the hole 407 when the protruded part 302 is inserted into the hole 407 formed in the extension part 403. The concave part 303 may be disposed to be in contact with a part of the second surface 405 of the extension part 403 other than the hole 407.

Figure 7:
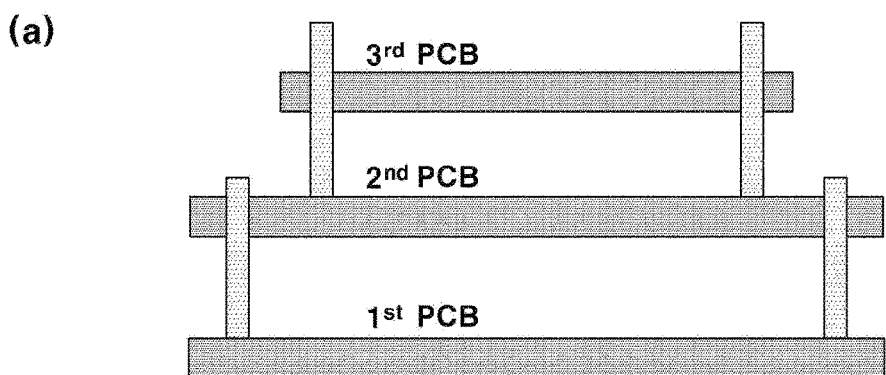
FIG. 7(*a*) illustrates a conventional substrate arrangement structure; and (b) illustrates a substrate arrangement structure according to an embodiment of the present invention.
Figure 7:
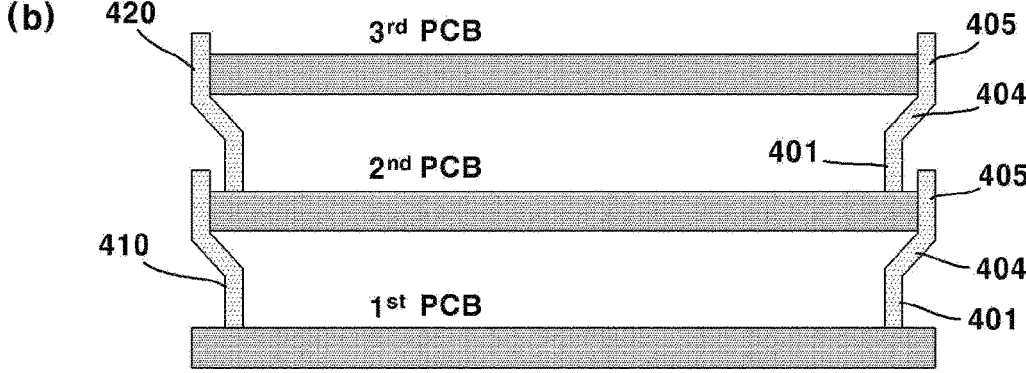

A rib 304 may be formed on a third side surface and a fourth side surface of the substrate 300. A protrusion 305 may be formed on both sides of the ribs 304. A flexible substrate 340 may be connected to the rib 304 of different substrates. The rib 304 of the substrate 300 may form a space so that the flexible substrate 340 being connected to the rib 304 is disposed inside the second body 220. Referring to FIG. 7(*a*), in an existing substrate arrangement structure, the upper support member was disposed more inward than the lower support member in order to avoid mutual interference between the lower support member disposed between the first substrate and the second substrate and the upper support member disposed between the second substrate and the third substrate. In this case, there is a problem that the size of the third substrate is reduced compared to the first substrate and the second substrate. Referring to FIG. 7(*b*), in a substrate arrangement structure according to the present invention, the extension part 403 of the support member 400 can be spaced apart and fixed in an optical axis direction as first to third substrates 300 of the same size through the first surface 404 forming an inclined surface and the second surface 405 in which a protruded part 302 of the side surface of the substrate is inserted and fixed.

A groove 408 being recessed inward may be formed in a part where the sidewall 401 of the support member 400 and the first surface 404 of the extension part 403 are connected. The groove 408 may be formed to increase the rigidity of the part where the first surface 404 of the extension part 403 and the sidewalls 401 are connected. The groove 408 may be formed in a triangular shape facing each other. The groove 408 may be formed in a shape where inclined surfaces being recessed inward face each other.

Although embodiments of the present invention have been described above with reference to the attached drawings, those skilled in the art will understand that the present invention can be implemented in other specific forms without changing the technical idea or essential features. Therefore, the embodiments described above should be understood in all respects as illustrative and not restrictive.

The invention claimed is:

1. A camera module comprising:
a first body in which a lens is disposed;
a second body coupling with the first body;
a plurality of substrates being disposed between the first body and the second body; and
a support member for fixing the plurality of substrates so that the substrates are spaced apart in an optical axis direction,
wherein the support member comprises sidewalls being disposed between different substrates and extension parts being extended from the sidewalls, and
wherein a part where the sidewalls and the first surface of the extension part are connected comprises a plurality of grooves being formed by being recessed.

2. The camera module according to claim 1,
wherein the extension part comprises: a first surface being extended from the sidewalls to form an inclined surface; a second surface being extended from the first surface and including a hole; and a third surface being extended from the second surface to form an inclined surface.

3. The camera module according to claim 2,
wherein a side surface among at least one of the plurality of substrates comprises a protruded part coupling to the hole of the second surface of the extension part.

4. The camera module according to claim 3,
wherein at least one substrate among the plurality of substrates comprises a rib being in contact with the sidewalls of the support member on a side surface not being formed with the protruded part.

5. The camera module according to claim 1,
wherein the support member comprises a connecting part for connecting two adjacent sidewalls and being perpendicular to the sidewalls.

6. The camera module according to claim 5,
wherein the connecting part of the support member is formed in a plane parallel to the substrate.

7. The camera module according to claim 5,
wherein the connecting part of the support member is formed so that both end parts are perpendicular to each side wall, and a center part is formed to form an obtuse angle with both end parts.

8. The camera module according to claim 5,
wherein an inner side surface of the connecting part is formed to be longer than an outer side surface of the connecting part.

9. The camera module according to claim 5,
wherein the connecting part is formed to correspond to a shape of the edge of the substrate.

10. The camera module according to claim 5,
wherein one surface of the connecting part is in contact with an upper surface of at least one of the plurality of substrates.

11. The camera module according to claim 1,
wherein one surface of the connecting part and an upper surface of at least one of the plurality of substrates is fixed with an adhesive.

12. The camera module according to claim 1,
wherein the plurality of substrates comprises first to third substrates sequentially adjacent to the first body, and
wherein the support member comprises: a first support member being disposed between the first substrate and the second substrate; and a second support member being disposed between the second substrate and the third substrate.

13. The camera module according to claim 12,
wherein the sidewalls of the first support member and the sidewalls of the second support member are disposed to be overlapped with each other in an optical axis direction.

14. The camera module according to claim 12,
wherein the second substrate and the third substrate have the same shape and size.

15. A camera module comprising:
a first body on which a lens is disposed;
a second body being coupled to the first body;
first to third substrates being disposed between the first body and the second body;
a first support member being disposed between the first substrate and the second substrate; and
a second support member being disposed between the second substrate and the third substrate, wherein the first and second support members comprise sidewalls being disposed between different substrates and an extension part being extended from the sidewalls, and wherein the extension part comprises: a first surface being extended from the sidewalls to form an inclined surface; a second surface being extended from the first surface and including a hole; and a third surface being extended from the second surface to form an inclined surface.

16. The camera module according to claim 15, wherein in a part where the sidewalls and the first surface of the extension part are connected, a plurality of grooves formed by being recessed is included.

17. The camera module according to claim 15, wherein the first and second support members include a connecting part for connecting two adjacent sidewalls and being perpendicular to the sidewalls.

18. The camera module according to claim 17, wherein the connecting part of the first and second support members is formed in a plane parallel to the first to third substrates.

* * * * *